United States Patent
Hisanaga et al.

(10) Patent No.: US 9,080,495 B2
(45) Date of Patent: Jul. 14, 2015

(54) EXHAUST HEAT RECOVERY DEVICE

(75) Inventors: Toru Hisanaga, Shizuoka (JP);
Tomoyuki Uchida, Shizuoka (JP);
Shingo Oshimizu, Shizuoka (JP);
Toshihiro Kondo, Shizuoka (JP)

(73) Assignee: YUTAKA GIKEN CO., LTD. (JP)

( * ) Notice: Subject to any disclaimer, the term of this patent is extended or adjusted under 35 U.S.C. 154(b) by 383 days.

(21) Appl. No.: 13/411,046

(22) Filed: Mar. 2, 2012

(65) Prior Publication Data
US 2012/0222838 A1    Sep. 6, 2012

(30) Foreign Application Priority Data

Mar. 3, 2011 (JP) .................................. 2011-046796
May 27, 2011 (JP) .................................. 2011-119183

(51) Int. Cl.
| | | |
|---|---|---|
| F28F 27/02 | (2006.01) | |
| F28F 1/00 | (2006.01) | |
| F28B 9/10 | (2006.01) | |
| F01N 5/02 | (2006.01) | |
| B08B 9/02 | (2006.01) | |
| F02B 47/08 | (2006.01) | |
| F01N 13/08 | (2010.01) | |

(Continued)

(52) U.S. Cl.
CPC .......... *F01N 13/082* (2013.01); *F01N 13/1805* (2013.01); *F01N 2240/02* (2013.01); *F28B 1/02* (2013.01); *F28F 9/0246* (2013.01); *F28F 27/02* (2013.01)

(58) Field of Classification Search
CPC ............ F28F 27/02; F28F 9/0246; F28B 1/02
USPC ............... 165/103, 178, 113, 51; 137/599.14; 123/568.11, 568.12
See application file for complete search history.

(56) References Cited

U.S. PATENT DOCUMENTS

| | | | | |
|---|---|---|---|---|
| 1,658,766 A | * | 2/1928 | Gray ............................. | 181/254 |
| 2,488,563 A | * | 11/1949 | Sills ............................... | 60/288 |

(Continued)

FOREIGN PATENT DOCUMENTS

| | | |
|---|---|---|
| JP | 2006037773 | 2/2006 |
| JP | 2007071118 | 3/2007 |

(Continued)

OTHER PUBLICATIONS

Notification of Reasons for Refusal mailed Dec. 10, 2013 issued in Japanese Patent Appln. No. P2011-046796.

*Primary Examiner* — M. Alexandra Elve
*Assistant Examiner* — Joel Attey
(74) *Attorney, Agent, or Firm* — Adams & Wilks

(57) ABSTRACT

An exhaust heat recovery device includes a multi-piece, chamber-shaped branching member with a draw-molded first chamber half having one inlet for introducing exhaust gas, and a draw-molded second chamber half having two outlets for discharging the exhaust gas. The draw-molded first and second chamber halves are integrally connected together to form a single chamber. A first flow channel extends from one of the two outlets of the branching member for circulating the exhaust gas. A heat exchanger is provided to the first flow channel for recovering potential heat of the exhaust gas. A second flow channel extends from the other one of the two outlets of the branching member for circulating the exhaust gas while bypassing the heat exchanger. A valve chamber houses a valve configured to open and close an outlet of the second flow channel.

13 Claims, 11 Drawing Sheets

(51) Int. Cl.
*F01N 13/18* (2010.01)
*F28B 1/02* (2006.01)
*F28F 9/02* (2006.01)

(56) References Cited

U.S. PATENT DOCUMENTS

| | | | | |
|---|---|---|---|---|
| 4,424,775 | A * | 1/1984 | Mayfield et al. | 123/142.5 R |
| 4,467,887 | A * | 8/1984 | Vizard | 181/265 |
| 4,577,724 | A * | 3/1986 | Vizard | 181/265 |
| 4,778,073 | A * | 10/1988 | Ehs | 220/590 |
| 5,213,227 | A * | 5/1993 | Koyama et al. | 220/359.3 |
| 5,410,876 | A * | 5/1995 | Simko | 60/288 |
| 6,185,819 | B1 * | 2/2001 | Bauer et al. | 29/890 |
| 6,253,547 | B1 * | 7/2001 | Watanabe et al. | 60/297 |
| 6,324,758 | B1 * | 12/2001 | Huang et al. | 29/890 |
| 6,601,444 | B2 * | 8/2003 | Ohmori et al. | 73/114.71 |
| 6,823,660 | B2 * | 11/2004 | Minami | 60/280 |
| 6,823,664 | B2 * | 11/2004 | Nakatani et al. | 60/295 |
| 7,121,301 | B2 * | 10/2006 | Krogull et al. | 137/587 |
| 7,527,126 | B2 * | 5/2009 | Kuroda et al. | 181/254 |
| 8,397,863 | B2 * | 3/2013 | Paze' | 181/254 |
| 2005/0012333 | A1 * | 1/2005 | Baich et al. | 285/354 |
| 2005/0098160 | A1 * | 5/2005 | Taxon | 123/516 |
| 2006/0237176 | A1 * | 10/2006 | Vincent et al. | 165/148 |
| 2007/0017489 | A1 * | 1/2007 | Kuroki et al. | 123/568.12 |
| 2007/0272480 | A1 * | 11/2007 | Kuroda et al. | 181/254 |
| 2008/0182444 | A1 * | 7/2008 | Buhl et al. | 439/278 |
| 2008/0245344 | A1 * | 10/2008 | Kuji | 123/509 |
| 2008/0283039 | A1 * | 11/2008 | Waltz et al. | 126/290 |
| 2009/0235653 | A1 * | 9/2009 | Mital et al. | 60/311 |
| 2010/0000717 | A1 * | 1/2010 | Finck et al. | 165/103 |
| 2010/0199957 | A1 * | 8/2010 | Furukawa et al. | 123/568.12 |

FOREIGN PATENT DOCUMENTS

| | | |
|---|---|---|
| JP | 2009030569 | 2/2009 |
| WO | 2006090725 | 8/2006 |

* cited by examiner

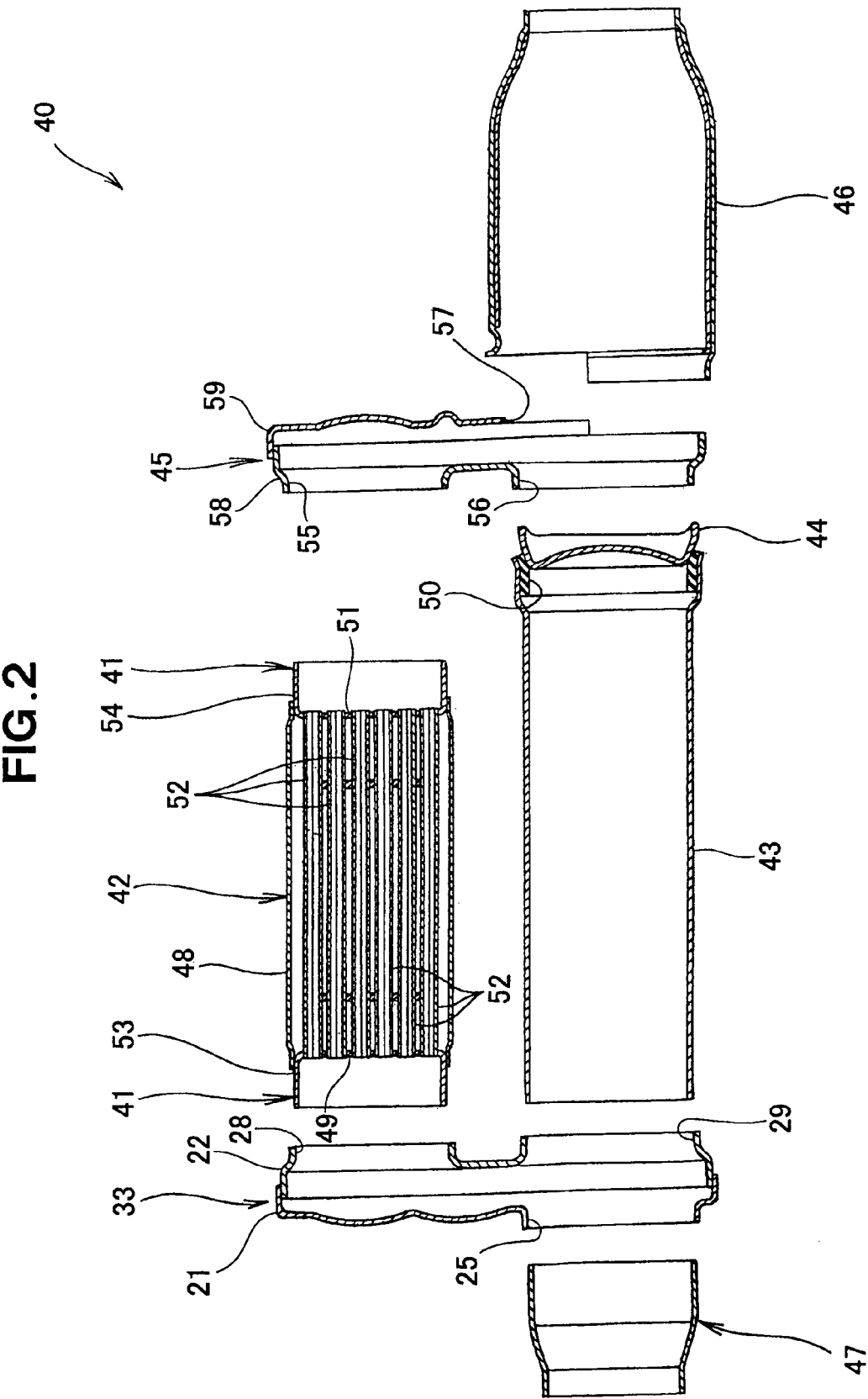

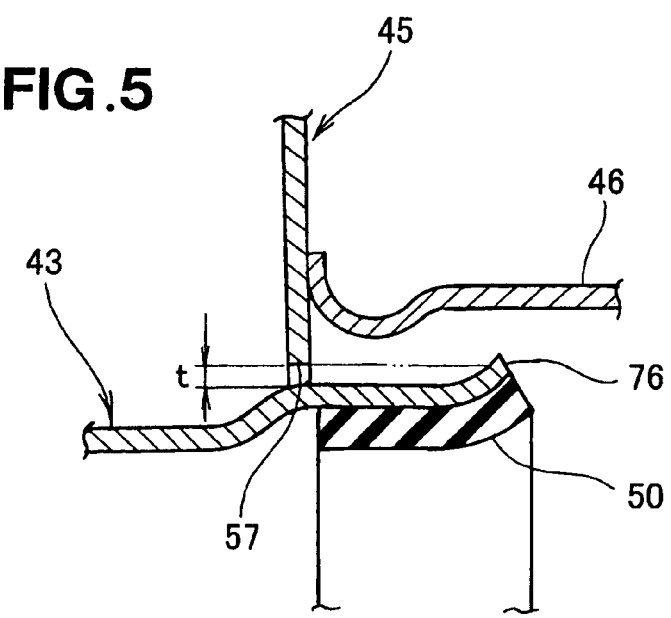
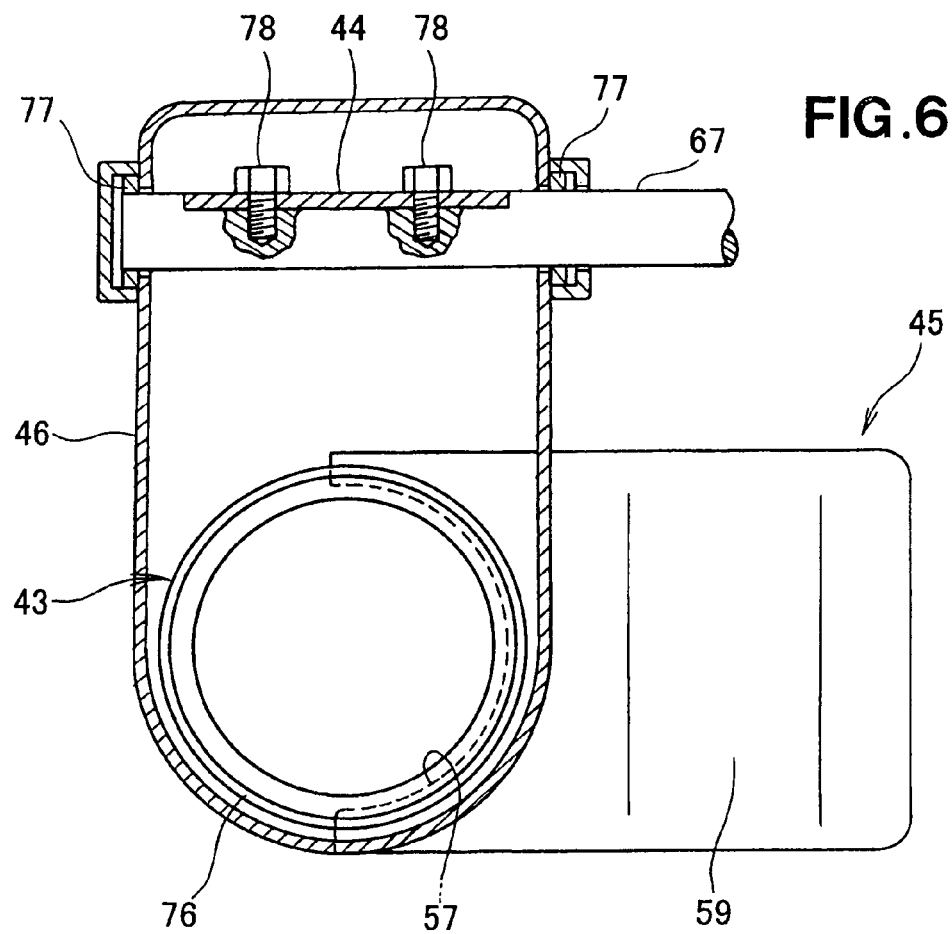

EXHAUST HEAT RECOVERY DEVICE

FIELD OF THE INVENTION

The present invention relates to an exhaust heat recovery device for recovering heat from an exhaust emission or gas.

BACKGROUND OF THE INVENTION

An internal combustion engine is designed to burn fuel to generate heat energy and to obtain power by converting the generated heat energy into kinetic energy. Not all of the heat energy can be converted to kinetic energy, because a portion of the heat energy is discharged into the atmosphere in the form of exhaust gas. The loss of heat energy through the exhaust gas reduces the efficiency of the internal combustion engine. A technique is known in which an exhaust heat recovery device is attached to the exhaust pipe, and a portion of the heat energy is recovered from the exhaust gas by the exhaust heat recovery device.

Japanese Patent Application Laid-Open Publication No. 2009-30569, for example, discloses an exhaust heat recovery device. The structure of this exhaust heat recovery device is described with reference to FIG. 13 hereof.

As shown in FIG. 13, the exhaust heat recovery device 100 is composed of a bypass flow channel 101 for circulating exhaust gas, the bypass flow channel being connected to an exhaust pipe extending from an internal combustion engine; a branching channel 103 branched at a right angle to the axis of the bypass flow channel 101 from the vicinity of an inlet 102 of the bypass flow channel 101; a valve 105 capable of opening and closing, for blocking an outlet 104 of the bypass flow channel 101; a valve shaft 106 for rotating the valve 105; a curved pipe 107 which extends from the valve 105; a case 108 for housing the bypass flow channel 101, the valve 105, and the curved pipe 107 at once; an exhaust heat recovery flow channel 111 for circulating the exhaust gas fed from the branching channel 103, the exhaust heat recovery flow channel being formed in the case 108; and a heat exchanger 112 which fits in the exhaust heat recovery flow channel 111. The bypass flow channel 101 is a flow channel for bypassing the heat exchanger 112.

The medium of the high-temperature side of the heat exchanger 112 is the exhaust gas, and the medium of the low-temperature side is a coolant of the internal combustion engine.

The valve shaft 106 for supporting the valve 105 is urged toward the valve-closing side by a torsion spring. When the flow rate of exhaust gas through the bypass flow channel 101 is high, the gas pressure overcomes the urging force of the torsion spring. As a result, the valve is opened. When the flow rate of exhaust gas is low, the valve is closed by the action of the torsion spring.

The valve shaft 106 is also rotated by a thermo-actuator via the torsion spring. The coolant for cooling the internal combustion engine is passed through the thermo-actuator. When the coolant is at a high temperature, the valve shaft 106 is rotated toward the valve-open side by the thermo-actuator, and when the coolant is at a low temperature, the valve shaft 106 is rotated toward the valve-closed side.

The coolant is at a low temperature when the internal combustion engine is started. The flow rate of exhaust gas is low during idling. The valve is closed under these conditions. Exhaust gas flows to the exhaust heat recovery flow channel 111 without flowing to the bypass flow channel 101. Heat is recovered by the heat exchanger 112, and the coolant is heated.

When the flow rate of exhaust gas is high even at startup of the internal combustion engine, the valve opens and the exhaust gas flows to the bypass flow channel 101. The bypass flow channel 101 has minimal flow channel resistance, and is therefore capable of circulating a large amount of exhaust gas.

The coolant reaches a high temperature once operation has continued for a certain amount of time. The valve is opened by the action of the thermo-actuator, and the exhaust gas flows to the bypass flow channel 101. The reason for this is that there is no need for the coolant to be warmed by the heat exchanger 112 when the coolant is at a high temperature.

The case 108 is formed by welding together two case halves that are divided in the front-back direction of the drawing. Before welding, the bypass flow channel 101, the valve 105, the valve shaft 106, and the heat exchanger 112 are placed in a case half. A first seal 113 is wrapped around the branching channel 103, and a second seal 114 is wrapped around the bypass flow channel 101. The other case half is then placed over the first case half, and the case halves are welded together.

Leakage and backflow of exhaust gas are prevented by the first seal 113 and/or the second seal 114.

The first seal 113 and/or the second seal 114 cannot be replaced after the case halves are welded together. However, the first seal 113 and/or the second seal 114 become worn over the course of operation. As wear progresses, the sealing ability of the seals decreases, and backflow of exhaust gas occurs. Assembly is also made inconvenient by the labor of packing the bypass flow channel 101, heat exchanger 112, and other components in the case halves and then welding the case halves. As a result, the cost of the exhaust heat recovery device increases, and the use of exhaust heat recovery devices is less easily adopted.

In order to promote the use of exhaust heat recovery devices, there is a need for an exhaust heat recovery device that is easily assembled.

When the exhaust heat recovery device 100 is mounted in a vehicle having significant space limitations, a curved pipe 115 is frequently connected to the inlet of the bypass flow channel 101. The use of a curved pipe 115 enables the duct length to be maintained in a limited space. When a curved pipe 115 is used, a portion of the exhaust gas impinges on the inside surface of the bypass flow channel 101, as indicated by the arrow (1) in FIG. 13. This impingement causes the flow to become disordered, and there is a risk of inability to maintain the flow rate of the exhaust gas.

There is therefore a need for an exhaust heat recovery device in which a smooth flow of exhaust gas is maintained even when a curved pipe is connected to the inlet.

SUMMARY OF THE INVENTION

An object of the present invention is to provide a structure for an exhaust heat recovery device that is easy to assemble.

Another object of the present invention is to provide an exhaust heat recovery device in which a smooth flow of exhaust gas is maintained even when a curved pipe is connected to an inlet.

According to an aspect of the present invention, there is provided an exhaust heat recovery device which comprises: a multi-piece chamber-shaped branching member having one inlet for introducing exhaust gas and two outlets for discharging the exhaust gas; a first flow channel, extending from one of the two outlets, for circulating the exhaust gas; a heat exchanger, provided to the first flow channel, for recovering potential heat of the exhaust gas; a second flow channel, extending from other one of the two outlets, for circulating the exhaust gas while bypassing the heat exchanger; and a valve chamber for housing a valve designed to open and closing the outlet of the second flow channel, wherein the multi-piece branching member comprises a single chamber formed by joining together a first chamber half in which one inlet is provided, the first chamber half being draw-molded from a blank, and a second chamber half in which two outlets are provided, the second chamber half being draw-molded from a blank.

The multi-piece branching member is obtained by welding together the draw-molded first chamber half and the draw-molded second chamber half. Since draw molding and welding are easily performed, the manufacturing cost of the exhaust heat recovery device can be minimized.

Assembly is accomplished merely by connecting the first flow channel and second flow channel to the branching member. The heat exchanger is preferably provided to the first flow channel in advance. An easily assembled exhaust heat recovery device is thus provided.

In a preferred form, the exhaust heat recovery device further comprises a merging member, provided between the outlet of the first flow channel and the valve chamber, for circulating the exhaust gas from the first flow channel to the valve chamber while the merging member comprises a single chamber formed by joining together a third chamber half in which two inlets are provided, the third chamber half being draw-molded from a blank, and a fourth chamber half in which one outlet is provided, the fourth chamber half being draw-molded from a blank.

The merging member has a multi-piece construction and is obtained by welding together the draw-molded third chamber half and the draw-molded fourth chamber half. Since draw molding and welding are easily performed, the manufacturing cost of the exhaust heat recovery device can be minimized.

Preferably, the heat exchanger has an inlet directly connected to the branching member, and the heat exchanger has an outlet directly connected to the merging member.

Since the heat exchanger is directly connected to the branching member and the merging member, there is no need to provide a member between the branching member and the heat exchanger, and there is no need to provide a member between the heat exchanger and the merging member.

It is desirable that the outlet of the second flow channel have an outside diameter larger than the outlet of the merging member. It is also desirable that the valve chamber have an inside diameter larger than a diameter of the outlet of the merging member while the second flow channel have a distal end passing through the outlet of the merging member and into the valve chamber.

Exhaust gas the flows through the second flow channel is discharged to the valve chamber. The inside diameter of the valve chamber is larger than the diameter of the outlet of the merging member. Specifically, the diameter of the outlet of the merging member is smaller than the inside diameter of the valve chamber. The outlet of the merging member is constricted with respect to the valve chamber. Since the outlet of the merging member is constricted, the exhaust gas in the valve chamber does not readily flow back to the merging member. A smooth flow of exhaust gas is thus achieved.

It is preferable that the inlet of the branching member be positioned so that a central axis of the inlet substantially coincides with a central axis of the other outlet, a curved pipe for introducing the exhaust gas be provided to the inlet, and the other outlet form a reducer part with an inside diameter decreasing along the flow of the exhaust gas, an inlet diameter of the reducer part being larger than an inside diameter of the curved pipe.

The curved pipe causes the flow of exhaust gas to be angled with respect to the central axis of the inlet of the branching member. In this state, the exhaust gas flows into the branching member. Since the reducer part has a large inlet diameter, exhaust gas is lead to the reducer part despite flowing at an angle. Specifically, a smooth flow of exhaust gas is maintained despite the connection of the curved pipe to the inlet.

Preferably, the central axis of the one outlet is offset toward the heat exchanger from the central axis of the inlet.

Even when the exhaust gas flows at an angle into the branching member toward the heat exchanger, since the other outlet is positioned toward the heat exchanger, the exhaust gas smoothly reaches the other outlet. A smooth flow of exhaust gas is maintained.

Desirably, inclination angles of the inside surfaces of the reducer part with respect to the central axis of the other outlet are configured so that the inclination angle of the inside surface that is closer to the heat exchanger is greater than the inclination angle of the inside surface that is farther from the heat exchanger.

Of the inclination angles of the inside surfaces of the regulator, the inclination angle of the inside surface that is closer to the heat exchanger is larger. Even when the exhaust gas flows at an angle into the branching member toward the heat exchanger, when the inside surface has a large inclination angle, there is no risk of the flow of exhaust gas becoming disordered. A smooth flow of exhaust gas is thereby maintained.

BRIEF DESCRIPTION OF THE DRAWINGS

Certain preferred embodiments of the present invention will be described in detail below, by way of example only, with reference to the accompanying drawings, in which:

FIG. 2 is an exploded view showing an exhaust heat recovery device according to the present invention;

FIG. 5 is an enlarged view of portion 5 of FIG. 3;

FIG. 6 is a sectional view taken along line 6-6 of FIG. 3;

DETAILED DESCRIPTION OF THE PREFERRED EMBODIMENTS

Figure 1A:
FIGS. 1A through 1F are schematic views illustrating the process for manufacturing a branching member according to the present invention.

As shown in FIG. 1A, a blank 11 and a blank 12 are provided.

Figure 1B:
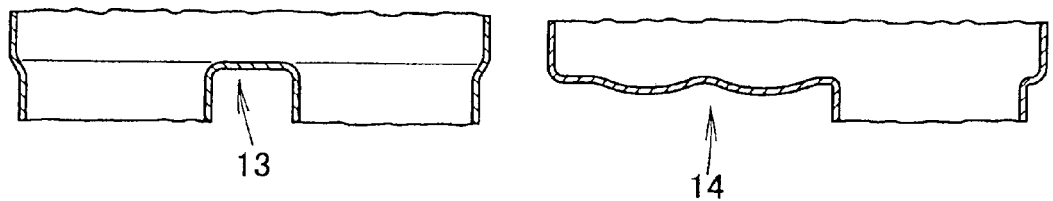

A draw-molded article 13 and a draw-molded article 14 are then obtained by a draw-molding process, as shown in FIG. 1B.

Figure 1C:
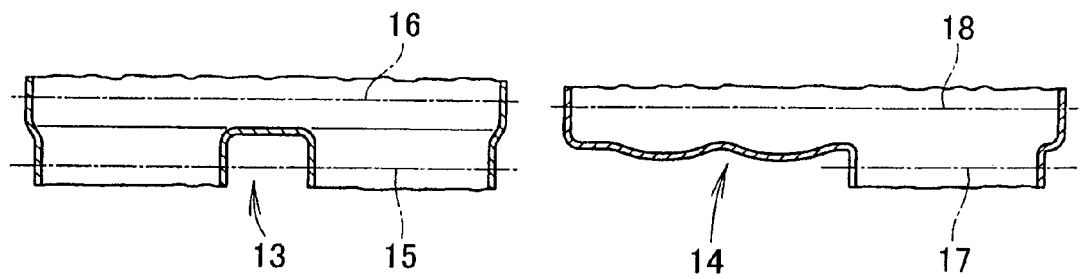

The draw-molded article 13 and the draw-molded article 14 are then trimmed by cutting along cutting lines 15, 16, 17, 18, as shown in FIG. 1C.

Figure 1D:
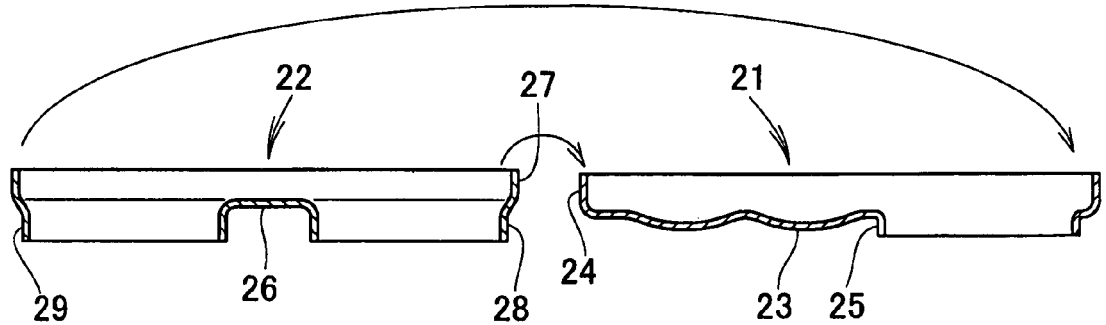

By the process described above, the first chamber half 21 and second chamber half 22 shown in FIG. 1D are obtained. The first chamber half 21 is composed of a first bottom 23 and a first wall 24 that stands upright on the periphery of the first bottom 23. An inlet 25 is provided in the first bottom 23. The second chamber half 22 is composed of a second bottom 26 and a second wall 27 that stands upright on the periphery of the second bottom 26. One outlet 28 and another outlet 29 are provided to the second bottom 26. Exhaust gas for heat recovery is discharged from the one outlet 28.

Figure 1E:
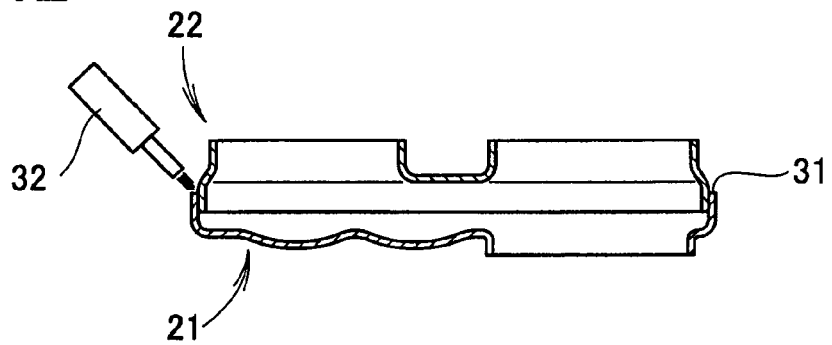

As shown in FIG. 1E, the second chamber half 22 is fitted in the first chamber half 21. A mating part 31 is then bonded using a welding torch 32.

Figure 1F:
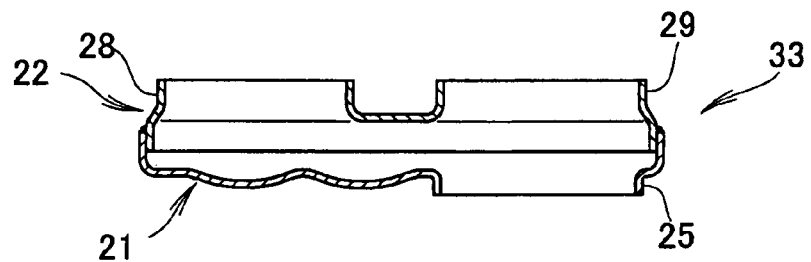

As shown in FIG. 1F, a multi-piece chamber-shaped branching member 33 is obtained.

The constituent elements of the exhaust heat recovery device 40 of the present invention will be described based on FIG. 2.

As shown in FIG. 2, the exhaust heat recovery device 40 is composed of the multi-piece branching member 33; a first flow channel 41 connected to the one outlet 28 of the branching member 33; a heat exchanger 42 provided to the first flow channel 41; a second flow channel 43 connected to the other outlet 29 of the branching member 33; a valve 44 for blocking an outlet of the second flow channel 43; a merging member 45 connected to the first flow channel 41 and second flow channel 43; and a valve chamber 46 for surrounding the valve 44 connected to the merging member 45. An outlet of an exhaust pipe extending from an internal combustion engine is connected to the inlet 25 of the branching member 33. However, in this example, an introduction member 47 is connected to the inlet 25, and the outlet of the exhaust pipe is connected to the introduction member 47.

The heat exchanger 42 is composed of a core case 48; an entrance-side end plate 49 for blocking an inlet of the core case 48; an exit-side end plate 51 for blocking an outlet of the core case 48; a plurality of heat transfer tubes 52 housed in the core case 48 so as to penetrate through the entrance-side end plate 49 and the exit-side end plate 51; an entrance-side extension 53 which extends toward the branching member 33 from the entrance-side end plate 49; and an exit-side extension 54 which extends toward the merging member 45 from the exit-side end plate 51. The entrance-side extension 53 and the exit-side extension 54 each serve as a first flow channel 41. High-temperature exhaust gas flows into the heat transfer tubes 52. Low-temperature coolant is circulated outside the heat transfer tubes 52. The heat of the exhaust gas moves to the coolant via the heat transfer tubes 52. The temperature of the exhaust gas decreases, and the temperature of the coolant increases. Waste heat is thus recovered.

The second flow channel 43 comprises a straight metal tube. The sealing ability of the valve 44 is increased by providing a retainer member 50 to the outlet of the second flow channel 43.

The merging member 45 has a multi-piece construction and is manufactured by the same process as the branching member 33. Since FIGS. 1A through 1F can be referred to for this process, no further description thereof will be given.

The merging member 45 is a chamber provided with two inlets 55, 56 and one outlet 57. Specifically, the merging member 45 is composed of a third chamber half 58 which is provided with two inlets 55, 56, and a fourth chamber half 59 which is provided with one outlet 57.

The valve chamber 46 is a metal tube having a larger inside diameter than the outlet 57.

The method of assembly will next be described.

The introduction member 47 is inserted in the inlet 25 of the branching member 33.

The entrance-side extension 53 corresponding to the inlet of the first flow channel 41 is inserted in the one outlet 28 of the branching member 33. The exit-side extension 54 corresponding to the outlet of the first flow channel 41 is inserted in one inlet 55 of the merging member 45.

A means must be devised to attach the second flow channel 43. Specifically, the second flow channel 43 is inserted in the merging member 45 so as to pass through the outlet 57 and other inlet 56 of the merging member 45. The inlet of the second flow channel 43 is also inserted in the other outlet 29 of the branching member 33.

The inlet of the valve chamber 46 is placed against (touching) the outlet of the merging member 45.

Figure 3:
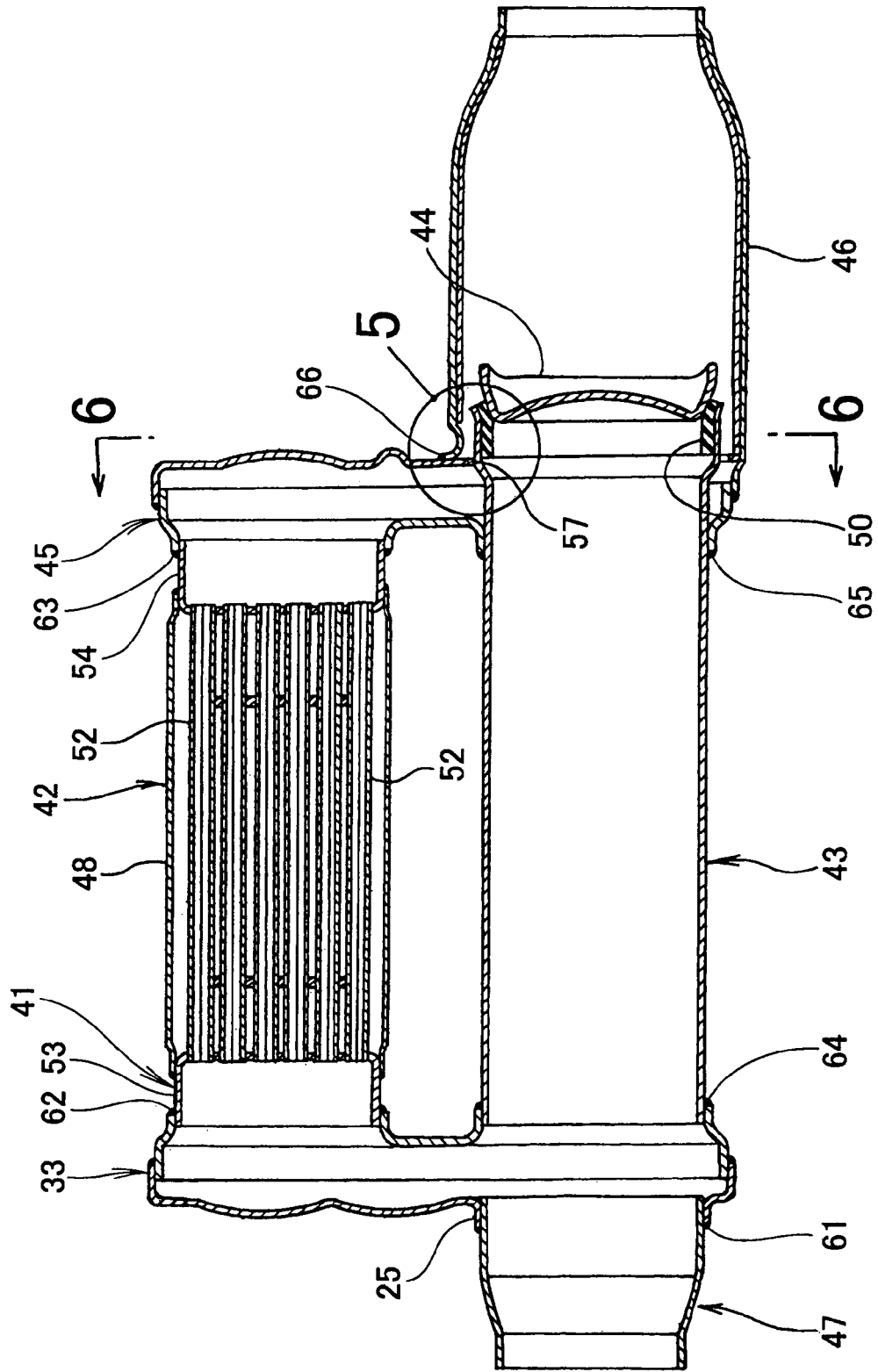
FIG. 3 is a sectional view showing the exhaust heat recovery device.

As shown in FIG. 3, the introduction member 47 is joined to the branching member 33 by a first bead 61, the entrance-side extension 53 is joined to the branching member 33 by a second bead 62, and the exit-side extension 54 is joined to the merging member 45 by a third bead 63. The inlet of the second flow channel 43 is joined to the branching member 33 by a fourth bead 64, and the outlet of the second flow channel 43 is joined to the merging member 45 by a fifth bead 65. The valve chamber 46 is joined to the merging member 45 by a sixth bead 66.

Pre-welding assembly is completed by placing against or inserting the first flow channel 41, second flow channel 43, and valve chamber 46 into the chamber-shaped branching member 33 and chamber-shaped merging member 45. After this assembly, the welding is performed merely by joining together the first through sixth beads 61 through 66, and is therefore easily performed. Assembly is thereby facilitated.

The overall form of the exhaust heat recovery device 40 will next be described based on FIG. 4.

Figure 4:
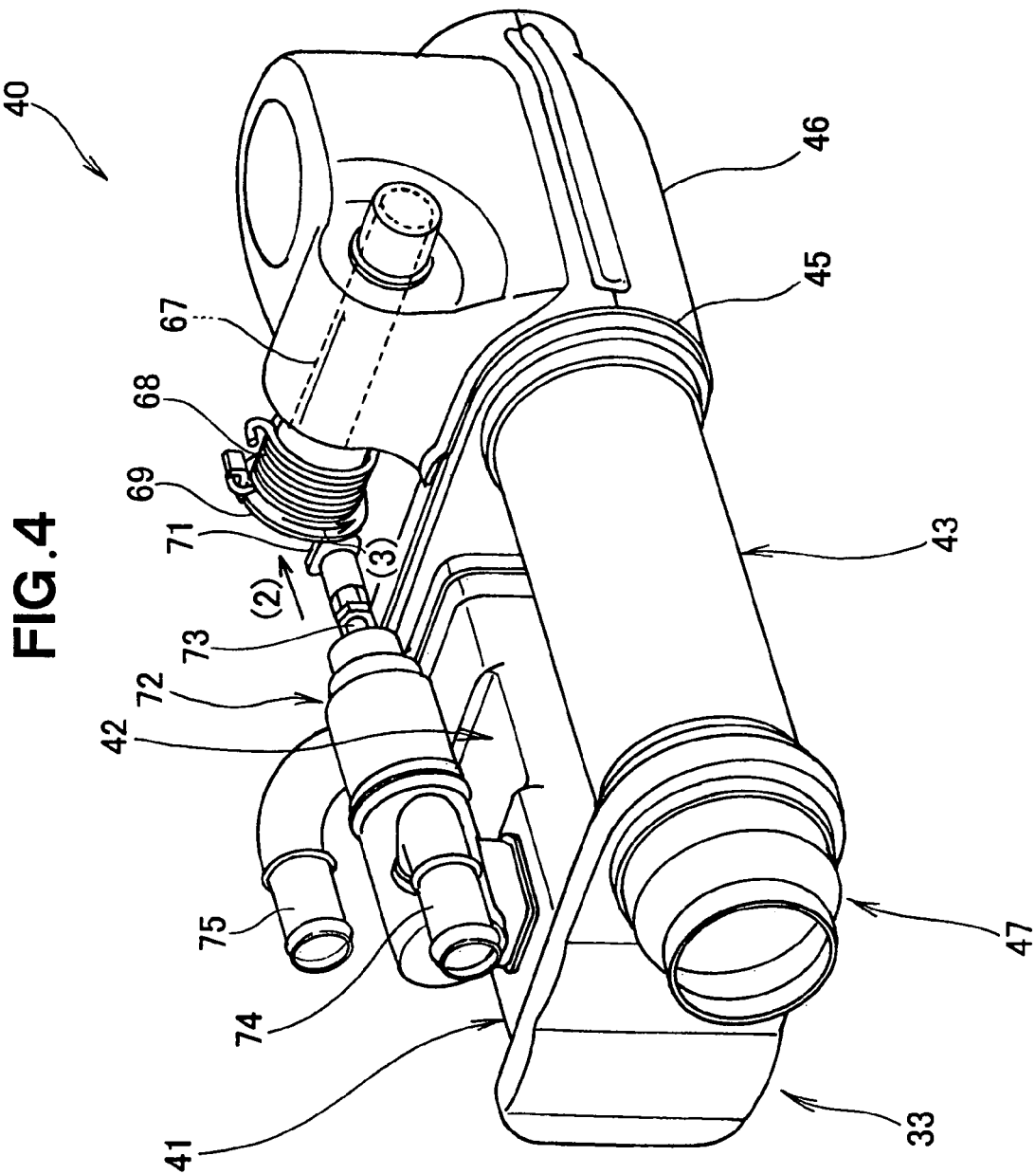
FIG. 4 is a perspective view showing the exhaust heat recovery device.

As shown in FIG. 4, a valve shaft 67 passes over the valve chamber 46. A disc 69 is attached to one end of the valve shaft 67 via a torsion spring 68. A lever 71 extends from the disc 69, and a rod 73 of a thermo-actuator 72 is connected to the lever 71. The thermo-actuator 72 is mounted on the heat exchanger 42.

The coolant is introduced from a medium inlet 74 of the thermo-actuator 72. The coolant exits from a medium outlet 75 after heating or cooling a thermal wax housed in the thermo-actuator 72. In the event that the coolant reaches a high temperature, the thermal wax expands, and the rod 73 advances as indicated by the arrow (2). This advancing causes the lever 71 to rotate as indicated by the arrow (3), and the valve shaft 67 also rotates via the torsion spring 68 in the direction indicated by the arrow (3).

The relevant parts of FIG. 3 will be described based on FIGS. 5 through 7.

As shown in FIG. 5, the outside diameter of the outlet of the second flow channel 43 is larger than the diameter of the outlet 57 of the merging member 45. Exhaust gas flows from the merging member 45 to the valve chamber 46 through a gap that corresponds to half the difference in diameter. The inside diameter of the valve chamber 46 is larger than the diameter of the outlet 57 of the merging member 45, and a distal end of the second flow channel 43 passes through the outlet 57 of the merging member 45 and into the valve chamber 46. During exhaust heat non-recovery, the exhaust gas flows into the valve chamber 46 from the second flow channel 43. The exhaust gas at this time preferably does not flow back into the merging member 45 from the valve chamber 46. As shown in FIG. 5, the outlet 57 of the merging member 45 is constricted with respect to the valve chamber 46. Since the outlet is constricted, there is no risk of backflow of the exhaust gas of the valve chamber 46 into the merging member 45. An end part 76 of the second flow channel 43 is also subjected to a tube expansion process so that the outside diameter of the end part 76 is larger than the diameter of the outlet 57. Since the end part 76 is curved so as to approach the inside surface of the valve chamber 46, backflow of the exhaust gas is further prevented.

As shown in FIG. 6, the valve shaft 67 is supported by the valve chamber 46 so as to be able to rotate. Exhaust gas is prevented from leaking to the outside by seal rings 77, 77. The valve 44 is fixed to the valve shaft 67 by bolts 78, 78.

The outlet 57 is provided so as to cover one-half the circumference of the second flow channel 43. The end part 76 of the second flow channel 43 is fitted in the outlet 57. Giving the outlet 57 a length of one-half circumference ensures a degree of freedom in assembling the fourth chamber half 59 in the second flow channel 43. When the length exceeds one-half circumference, the second flow channel 43 is moved only in the front-back direction of the drawing, and the degree of freedom is reduced. A length of less than one-half circumference may cause the exhaust gas in the valve chamber 46 to flow back.

An operation of the exhaust heat recovery device 40 configured as described above will next be described.

Figure 7:
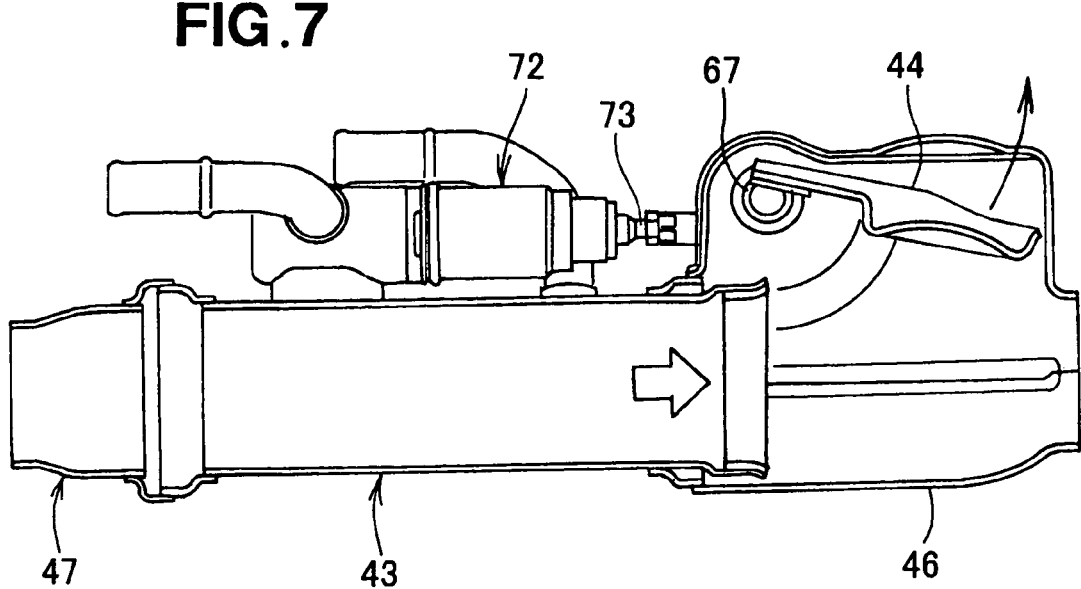
FIG. 7 is a view showing an operation of a second flow channel.

During acceleration or travel, when the flow rate of exhaust gas discharged from the internal combustion engine is high, the valve 44 is opened by the pressure of the exhaust gas, as shown in FIG. 7. The flow channel resistance of the second flow channel 43 is low. The second flow channel 43 is capable of accommodating a large flow of exhaust gas. Since the valve shaft 67 is rotated against the torsion spring by the pressure of the exhaust gas, a valve-open state occurs regardless of the position of the rod 73 of the thermo-actuator 72.

When the temperature of the coolant for cooling the internal combustion engine is high, the rod 73 in FIG. 7 advances, the valve shaft 67 is rotated via the torsion spring, and a valve-open state occurs. In the valve-open state, exhaust gas flows into the second flow channel 43, and no heat recovery takes place. Since one purpose of heat recovery is to warm the coolant, heat recovery is not performed when the coolant is already at a high temperature.

Figure 8:
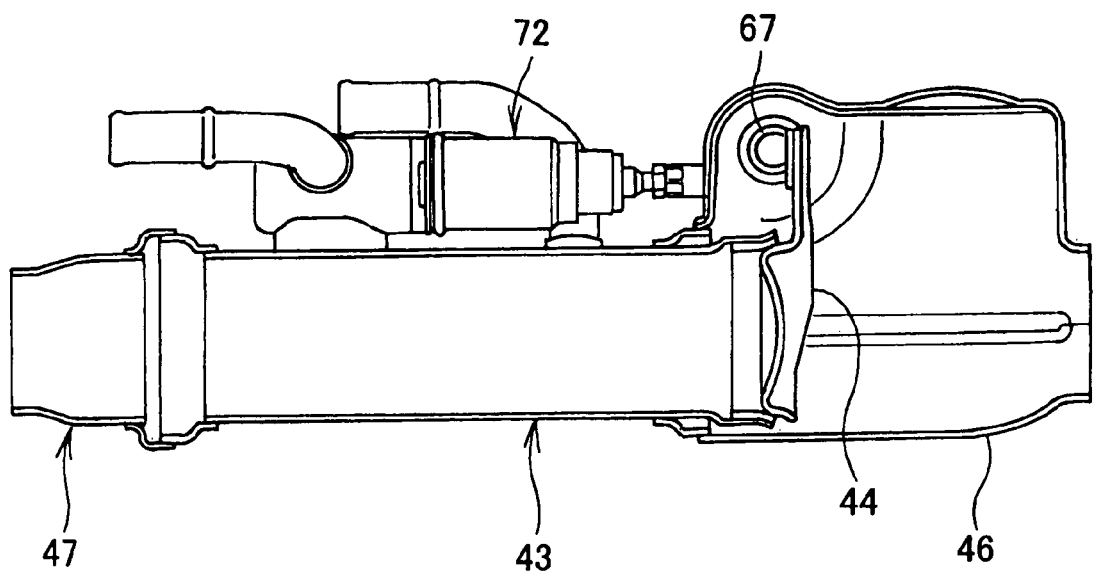
FIG. 8 is a view showing the operation of a first flow channel.

When the flow rate of exhaust gas is low and the temperature of the coolant is low, the rod 73 retreats, and the second flow channel 43 is closed by the valve 44 as shown in FIG. 8.

Figure 9:
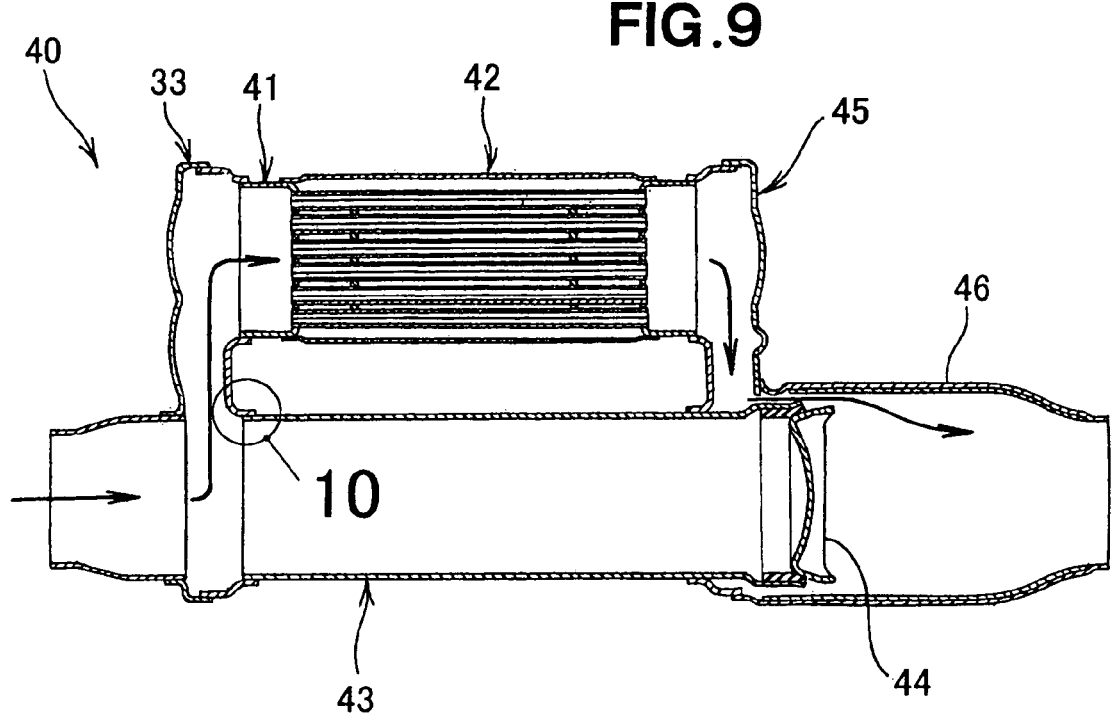
FIG. 9 is a view showing the operation of the heat exchanger.

The exhaust gas flows through the first flow channel 41, as shown in FIG. 9. Heat is exchanged by the heat exchanger 42, and the heat of the exhaust gas is transferred to the coolant.

Figure 10:
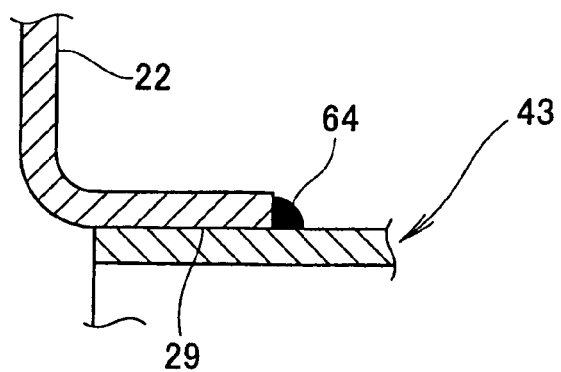
FIG. 10 is an enlarged view of portion 10 of FIG. 9.

As shown in FIG. 10, the outlet 29 is formed in a curved shape by draw-molding. When the second flow channel 43 is placed against a flat plate and fillet welded, a bead is formed at the location of maximum stress. There is a risk of cracks forming in the fillet weld due to repeated temperature variations.

Forming in a curved shape as shown in FIG. 10 makes it possible to position the fourth bead 64 away from the location of maximum stress. The stress at the fourth bead 64 can be reduced. The same reduction in stress occurs at the first through third beads and at the fifth bead.

Figure 11:
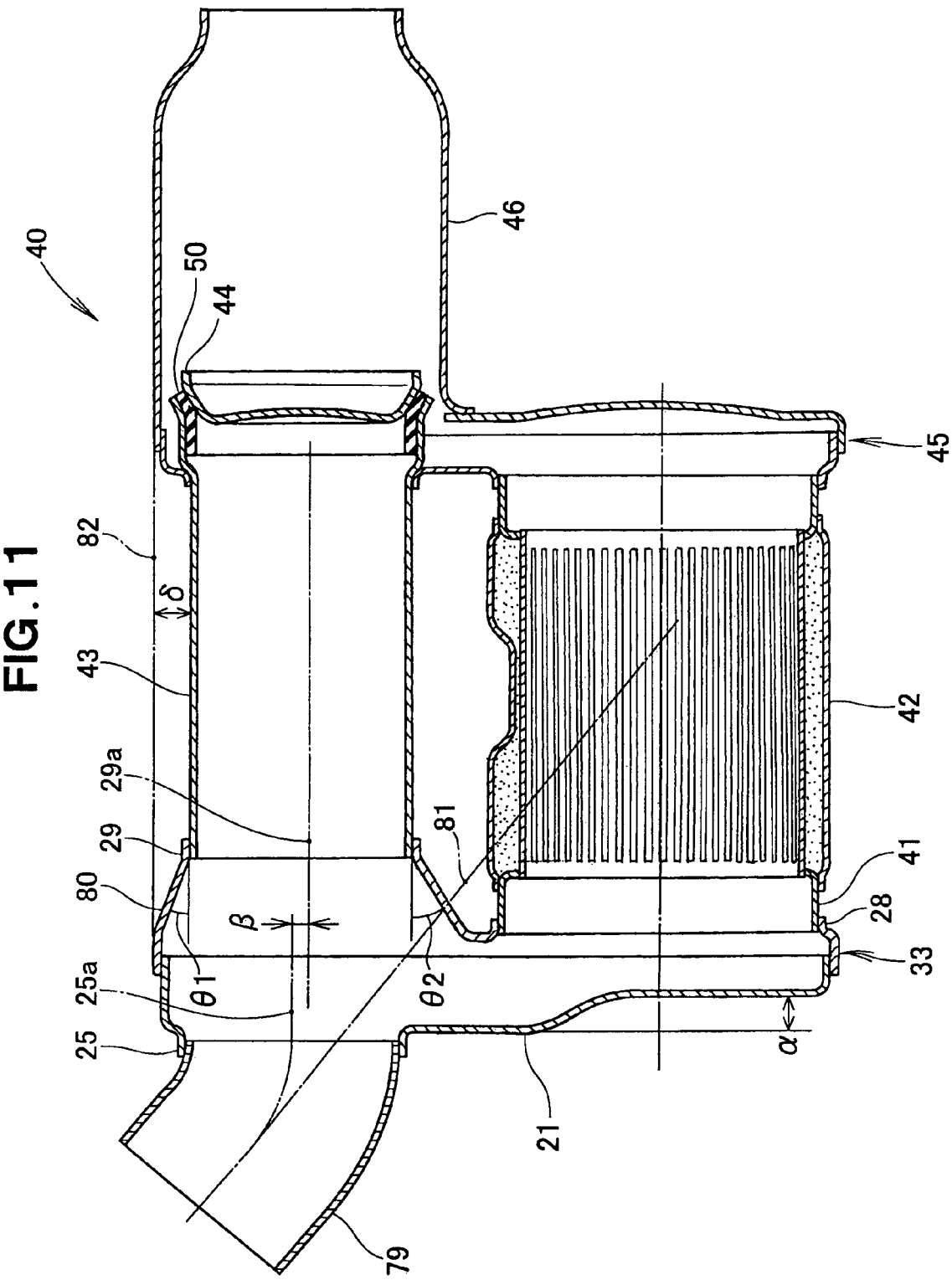
FIG. 11 is a view showing a modification of the exhaust heat recovery device of FIG. 3.

A modification of the configuration shown in FIG. 3 will be described based on FIG. 11. In FIG. 11, elements that are the same as those in FIG. 3 are referred to by the same symbols as in FIG. 3, and no description thereof will be given.

As shown in FIG. 11, in the branching member 33, the central axis 25a of the inlet 25 of the branching member 33 substantially coincides with the central axis 29a of the other outlet 29. A curved pipe 79 for introducing exhaust gas is connected to the inlet 25. The other outlet 29 forms a reducer part 80, the inside diameter of which decreases along the flow of exhaust gas, and the inlet diameter of the reducer part 80 is larger than the inside diameter of the curved pipe 79.

The curved pipe 79 causes the exhaust gas to flow along an inclined line 81. The inclined line 81 is inclined with respect to the central axis 25a of the inlet 25. In this state, the exhaust gas flows into the branching member 33. Since the reducer part 80 has a large inlet diameter, exhaust gas is lead to the reducer part 80 despite flowing at an angle. Specifically, a smooth flow of exhaust gas is maintained despite the connection of the curved pipe 79 to the inlet 25.

The outlet of the reducer part 80 has a small or reduced diameter, and the second flow channel 43 is connected to this outlet. The second flow channel 43 also has a small or reduced diameter and is recessed by an amount $\delta$ from a line 82 connecting the inlet of the reducer part 80 and the valve chamber 46. On-board equipment and the like can be placed in the depression thus formed.

It should also be noted that the first chamber half 21 is tapered by causing it to be partially curved or depressed toward the heat exchanger 42 by a distance a. By provision of the tapered part, it becomes possible to increase the rigidity of the branching member 33 and to make the exhaust gas flow uniformly and smoothly during heat recovery. The size of the heat recovery device can be reduced by the amount $\alpha$.

The central axis 29a of the other outlet 29 is preferably offset an amount $\beta$ toward the heat exchanger 42 from the central axis 25a of the inlet 25.

Even when the exhaust gas flows in toward the heat exchanger 42 along the inclined line 81, since the other outlet 29 is positioned toward the heat exchanger 42, there is no risk of the exhaust gas leaving the other outlet 29.

In the reducer part 80, the inclination angles $\theta 1$, $\theta 2$ of the inside surfaces of the regulator with respect to the central axis 29a of the other outlet 29 are preferably configured so that the inclination angle $\theta 2$ of the inside surface that is closer to the heat exchanger 42 is greater than the inclination angle $\theta 1$ of the inside surface that is farther from the heat exchanger 42.

The inside surface having the inclination angle $\theta 2$ intersects with the inclined line 81, and the angle of intersection is near 90°. The exhaust gas that flows along the inclined line 81 thus flows against the inside surface having the inclination angle $\theta 2$. The exhaust gas is then guided by this inside surface toward the second flow channel 43. Specifically, even when the exhaust gas flows at an angle into the branching member 33 toward the heat exchanger 42, when the inside surface has a large inclination angle, flow of the exhaust gas into the first flow channel 41 can be prevented and pressure loss can be reduced. A smooth flow of exhaust gas is thereby maintained.

Figure 12:
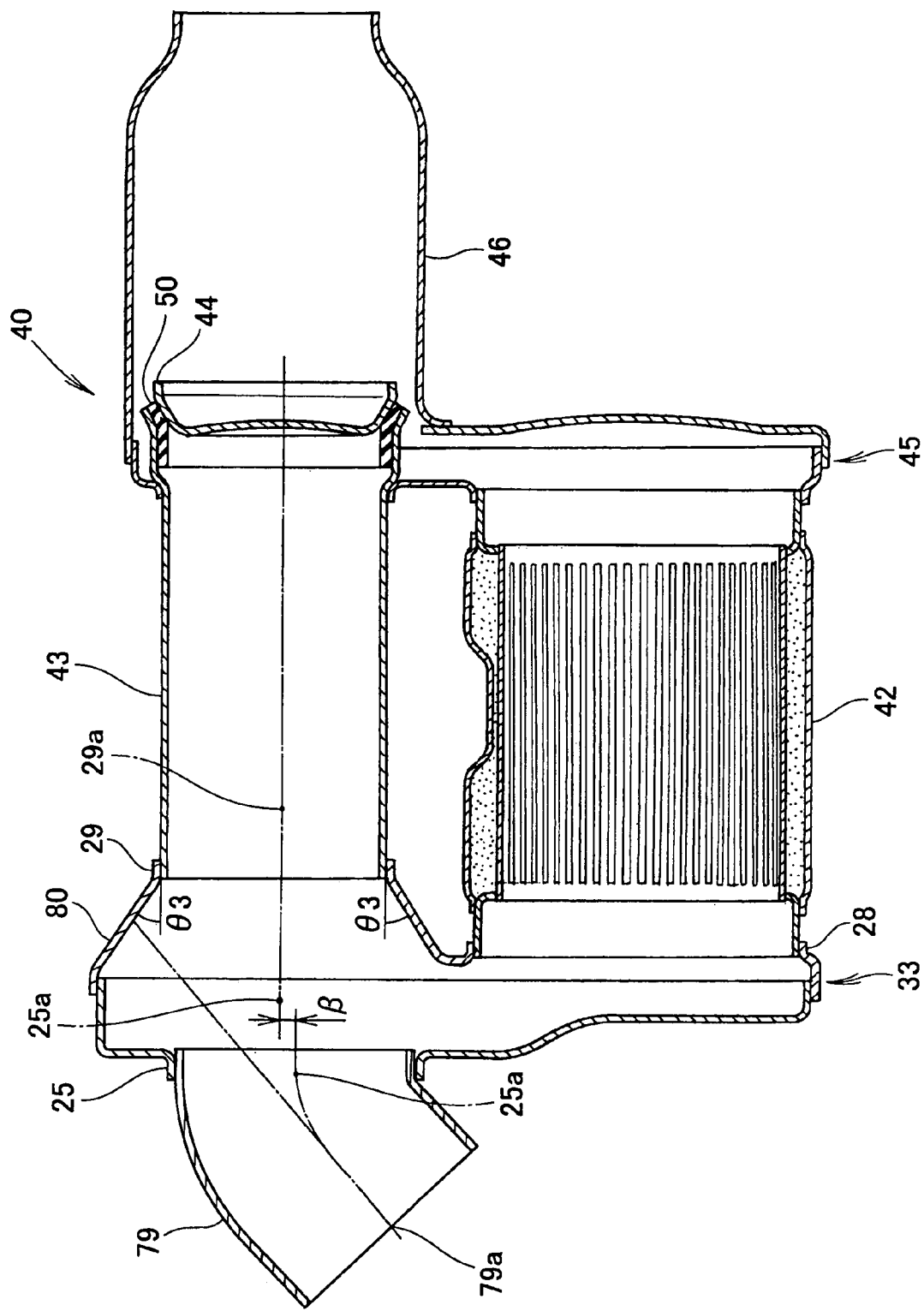
FIG. 12 is a view showing a modification of the exhaust heat recovery device of FIG. 11.
Figure 13:
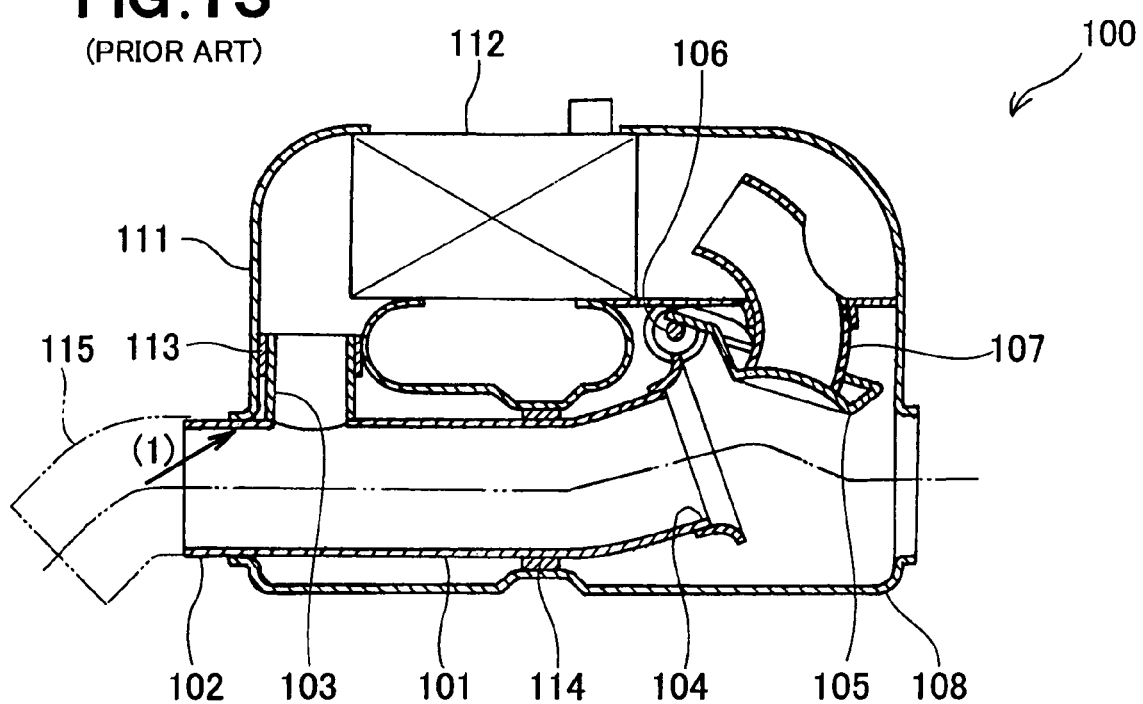
FIG. 13 is a sectional view showing a conventional exhaust heat recovery device.

A modification of the configuration shown in FIG. 11 will be described based on FIG. 12. In FIG. 12, elements that are the same as those in FIG. 11 are referred to by the same symbols as in FIG. 11, and no description thereof will be given.

As shown in FIG. 12, the inclination angles of the inside surface of the reducer part 80 with respect to the central axis 29a of the other outlet 29 are $\theta 3$ and $\theta 3$. An inlet center 79a of the curved pipe 79 is on the heat exchanger 42 side of the central axis 25a of the inlet 25 of the branching member 33. Setting the inclination angles to $\theta 3$ enables the curved pipe 79 to be rotated about the central axis 25a of the inlet 25. Specifically, the curved pipe 79 can be oriented in any direction.

The exhaust heat recovery device 40 of the present invention can be provided to an exhaust pipe that extends from an internal combustion engine to a muffler, or may be provided to an exhaust gas recirculation (EGR) duct for returning a portion of exhaust gas to an internal combustion engine. The exhaust heat recovery device 40 may also be used for other applications.

Obviously, various minor changes and modifications of the present invention are possible in light of the above teaching. It is therefore to be understood that within the scope of the appended claims the invention may be practiced otherwise than as specifically described.

What is claimed is:

1. An exhaust heat recovery device comprising:
   a multi-piece, chamber-shaped branching member comprised of a draw-molded first chamber half having one inlet for introducing exhaust gas and a draw-molded second chamber half having two outlets for discharging the exhaust gas, the draw-molded first and second chamber halves being integrally connected together to form a single chamber;
   a first flow channel extending from one of the two outlets of the branching member for circulating the exhaust gas;
   a heat exchanger provided to the first flow channel for recovering potential heat of the exhaust gas;
   a second flow channel extending from the other one of the two outlets of the branching member for circulating the exhaust gas while bypassing the heat exchanger;
   a valve chamber for housing a valve configured to open and close an outlet of the second flow channel; and
   a merging member provided between the valve chamber and an outlet of the first flow channel for circulating the exhaust gas from the first flow channel to the valve chamber, the merging member having a multi-piece construction comprised of a draw-molded third chamber half in which two inlets are provided and a draw-molded fourth chamber half in which one outlet is provided, the third and fourth chamber halves being integrally connected together to form a single chamber;
   wherein the outlet of the merging member has a diameter larger than an outside diameter of the outlet of the second flow channel, the valve chamber has an inside diameter larger that the diameter of the outlet of the merging member such that the outlet of the merging member is constricted with respect to the valve chamber, and the second flow channel has a distal end passing through the outlet of the merging member and into the valve chamber.

2. The exhaust heat recovery device of claim 1, wherein the heat exchanger has an inlet directly connected to the branching member, and the heat exchanger has an outlet directly connected to the merging member.

3. The exhaust recovery device of claim 1, wherein the inlet of the branching member is positioned so that a central axis of the inlet coincides with a central axis of the other of the two outlets of the branching member, a curved pipe for introducing the exhaust gas is provided to the inlet, and the other of the two outlets of the branching member forms a reducer part with an inside diameter decreasing along the flow of the exhaust gas, an inlet diameter of the reducer part being larger than an inside diameter of the curved pipe.

4. The exhaust heat recovery device of claim 3, wherein the one of the two outlets of the branching member has a central axis that is offset toward the heat exchanger from a central axis of the inlet.

5. The exhaust heat recovery device of claim 3, wherein inclination angles of the inside surfaces of the reducer part with respect to the central axis of the other of the two outlets of the branching member are configured so that the inclination angle of the inside surface that is closer to the heat exchanger is greater than the inclination angle of the inside surface that is farther from the heat exchanger.

6. An exhaust heat recovery device comprising:
   a multi-piece, chamber-shaped branching member comprised of a draw-molded first chamber half having one inlet for introducing exhaust gas and a draw-molded second chamber half having two outlets for discharging the exhaust gas, the draw-molded first and second chamber halves being integrally connected together to form a single chamber;
   a first flow channel extending from one of the two outlets of the branching member for circulating the exhaust gas;
   a heat exchanger provided to the first flow channel for recovering potential heat of the exhaust gas;
   a second flow channel extending from the other one of the two outlets of the branching member for circulating the exhaust gas while bypassing the heat exchanger;
   a valve chamber for housing a valve configured to open and close an outlet of the second flow channel; and
   a merging member comprised of two individual draw-molded chamber halves integrally connected together to form a single chamber, one of the chamber halves of the merging member having two inlets connected to respective outlets of the first and second flow channels, and the other of the chamber halves of the merging member having an outlet connected to an inlet of the valve chamber;
   wherein the outlet of the merging member has a diameter larger than an outside diameter of the outlet of the second flow channel, the valve chamber has an inside diameter larger than the diameter of the outlet of the merging member such that the outlet of the merging member is constricted with respect to the valve chamber, and the second flow channel has a distal end passing through the outlet of the merging member and into the valve chamber.

7. The exhaust heat recovery device of claim 6, wherein the heat exchanger is directly connected to the branching member and the merging member.

8. An exhaust heat recovery device for recovering heat from an exhaust emission, the exhaust heat recovery device comprising:
   a multi-piece branching member comprised of two individual draw-molded chamber halves integrally connected together to form a single chamber, one of the chamber halves having one inlet configured to introduce the exhaust emission and the other of the chamber halves having two outlets configured to discharge the introduced exhaust emission;
   a first flow channel having an inlet connected to one of the two outlets of the branching member and being configured to circulate the exhaust emission introduced by the inlet of the branching member;
   a heat exchanger disposed in the first flow channel and configured to recover heat from the exhaust emission circulated by the first flow channel;
   a second flow channel having an inlet connected to the other of the outlets of the branching member and being configured to circulate the exhaust emission introduced by the inlet of the branch member so as to bypass the heat exchanger;
   a merging member having a first inlet connected to the outlet of the first flow channel, a second inlet connected to the outlet of the second flow channel, and an outlet, the second flow channel being inserted into the merging member so as to extend through the first inlet and the outlet of the merging member;

a valve configured to open and close the outlet of the second flow channel; and a valve chamber housing the valve, the valve chamber comprising a tubular member having an inlet placed against the outlet of the merging member so that exhaust emission from the outlet of the first flow channel is circulated by the merging member from the first flow channel to the valve chamber;

wherein the outlet of the merging member has a diameter larger than an outside diameter of the outlet of the second flow channel, the valve chamber has an inside diameter larger than the diameter of the outlet of the merging member such that the outlet of the merging member is constricted with respect to the valve chamber, and the second flow channel has a distal end passing through the outlet of the merging member and into the valve chamber.

9. The exhaust heat recovery device of claim 8, wherein the merging member has a multi-piece construction comprised of two individual draw-molded chamber halves integrally connected together to form a single chamber, one of the chamber halves of the merging member having the first and second inlets and the other of the chamber halves of the merging member having the outlet of the merging member.

10. The exhaust heat recovery device of claim 8, wherein the heat exchanger has an inlet directly connected to the branching member and an outlet directly connected to the merging member.

11. The exhaust recovery device of claim 8; wherein the inlet of the branching member is positioned so that a central axis of the inlet coincides with a central axis of the other of the two outlets of the branching member, a curved pipe configured to introduce the exhaust gas is provided to the inlet of the branching member, and the other of the two outlets of the branching member forms a reducer part with an inside diameter decreasing along the flow of the exhaust emission, an inlet diameter of the reducer part being larger than an inside diameter of the curved pipe.

12. The exhaust heat recovery device of claim 11, wherein the one of the two outlets of the branching member has a central axis that is offset toward the heat exchanger from a central axis of the inlet of the branching member.

13. The exhaust heat recovery device of claim 11, wherein inclination angles of the inside surfaces of the reducer part with respect to the central axis of the other of the two outlets of the branching member are configured so that the inclination angle of the inside surface that is closer to the heat exchanger is greater than the inclination angle of the inside surface that is farther from the heat exchanger.

* * * * *